(12) United States Patent
Durrant et al.

(10) Patent No.: US 8,819,090 B2
(45) Date of Patent: Aug. 26, 2014

(54) TRUSTED FILE INDIRECTION

(75) Inventors: Paul Durrant, Royston (GB); Ben Chalmers, Longstanton (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 232 days.

(21) Appl. No.: 13/453,188

(22) Filed: Apr. 23, 2012

(65) Prior Publication Data

US 2013/0282776 A1 Oct. 24, 2013

(51) Int. Cl.
*G06F 17/30* (2006.01)
(52) U.S. Cl.
USPC ............................................ 707/821; 707/827
(58) Field of Classification Search
USPC .................................................. 707/821, 827
See application file for complete search history.

(56) References Cited

U.S. PATENT DOCUMENTS

| 8,060,476 | B1 * | 11/2011 | Afonso et al. ................. 707/649 |
| 8,132,168 | B2 * | 3/2012 | Wires et al. ........................ 718/1 |
| 8,150,801 | B2 * | 4/2012 | Srivastava et al. ............ 707/609 |
| 2009/0113424 | A1 | 4/2009 | Chen et al. |
| 2009/0313446 | A1 * | 12/2009 | Schuba et al. ................. 711/162 |
| 2010/0037096 | A1 | 2/2010 | Bum et al. |
| 2011/0047195 | A1 * | 2/2011 | Le et al. ......................... 707/827 |
| 2011/0055299 | A1 * | 3/2011 | Phillips .......................... 707/827 |
| 2011/0277027 | A1 * | 11/2011 | Hayton et al. ..................... 726/8 |
| 2011/0314035 | A1 | 12/2011 | Brunet et al. |

OTHER PUBLICATIONS

International Search Report and Written Opinion for Application No. PCT/US13/37693 mailed Nov. 1, 2013.
Microsoft Corporation, "Windows Update—Keep your PC up to date—Microsoft Windows", printed Apr. 23, 2012 from <windows.microsoft.com/en-US/windows/help/windows-update>.
Wikipedia, "Shared resource", printed Apr. 23, 2012 from <en.wikipedia.org/wiki/Shared_resource>.

* cited by examiner

*Primary Examiner* — Kim Nguyen
(74) *Attorney, Agent, or Firm* — Banner & Witcoff, Ltd.

(57) ABSTRACT

Methods and systems for performing file transfers across different domains hosted by a virtualization server are described herein. A trusted domain (Dom 0) may indicate that one or more files, directories, and/or volumes are available to a second domain (guest domain) by updating share information stored in a key value store. The guest domain may enumerate the shared files to appear as if within its own file system structure. The guest domain intercepts calls to its file system, determines whether the requested data is actually stored in its own file system or in trusted domain, and proxies the file system call to the trusted domain when the requested data is shared by the trusted domain. Key value store information and shared data information and contents may be communicated using one or more memories shared between the trusted domain and guest domain.

20 Claims, 7 Drawing Sheets

TRUSTED FILE INDIRECTION

FIELD

This application generally relates to computers and computer networks. In particular, this application relates to methods and systems for transferring files between virtual machines when at least one of the machines is untrusted.

BACKGROUND

Traditionally, personal computers included operating systems, applications, and user settings for a single user. Personal computers were generally both used and managed by their owners. However, many organizations are now using virtualization, remote access and/or clouds of computing resources to fulfill their computing needs. Clouds of virtualized computing resources generally allow for the operating systems, applications, and user settings of multiple users to be included on a single physical machine. Desktop virtualization technology allows multiple instances of an operating system to be kept separate, so the activities of one user does not affect the experience of other users. Cloud computing environments allow for computers owned by the cloud operator to be managed by the cloud operator but used by cloud users, who may be customers of the cloud operator. Cloud users, however, may include any person who signs up or enrolls in such a service, and therefore little may be known about the integrity of any given cloud subscriber or user. Thus, access to files on a trusted domain is not given to users of guest domains.

SUMMARY

In light of the foregoing background, the following presents a simplified summary of the present disclosure in order to provide a basic understanding of some aspects described herein. This summary is not an extensive overview, and it is not intended to identify key or critical elements or to delineate the scope of the claims. The following summary merely presents various described aspects in a simplified form as a prelude to the more detailed description provided below.

According to an aspect of the disclosure, a method of transferring data may be performed by receiving an indication that a data update is available to a guest domain executing on a hypervisor, where the data update includes one or more data files in a file system of a trusted domain executing on the hypervisor, and then aliasing each of the one or more data files to be accessible through a file system of the guest domain. Shared data may include one or more files, directories, and/or other locations of data.

According to one aspect, aliasing may be performed by a proxy driver intercepting file system calls within the guest domain and determining whether to execute each file system call within the file system of the guest domain or to pass the file system call to the trusted domain.

Aspects described herein may be performed by a virtualization server, or by software stored on computer readable media and executed by one or more processors. For example, one or more computer readable storage media may store computer executable instructions that, when executed, perform data transfer between a trusted domain and a guest domain executing on a hypervisor. The guest domain may receive an indication that shared data is available. A proxy driver executing in the guest domain may intercept a file system call associated with the shared data. The driver may send the file system call associated with the shared data to the trusted domain. The trusted domain may execute the file system call associated with the shared data, and return information to the guest domain based on execution of the file system call associated with the shared data.

In some aspects, the proxy driver may pass each file system call to the trusted domain using one or more pages of shared memory allocated to the guest domain. The trusted domain may execute the file system call on an associated data file in the file system of the trusted domain, and pass a response (e.g., requested data, an acknowledgement, etc.) back to the guest domain via the shared memory.

According to some aspects, the trusted domain may store a key value store (or database) that stores file metadata regarding shared files. A key value monitor executing in a guest domain may monitor the key value store for changes, and update a file system database administered by a proxy driver in the guest domain based on the shared file metadata (e.g., file name, file type, file location, file size, file date(s), etc.).

In one embodiment, a processor of a virtualization server may execute instructions stored in a memory to perform trusted file indirection. The virtualization server may include a hypervisor for managing execution of a multiple virtual machine (VM) instances, where each VM is allocated a different portion of memory. There may be a first VM instance executing on the hypervisor, where the first VM instance is a trusted server domain for administration of the server. The first VM instance may be allocated a first region of memory. There may be a second VM instance executing on the hypervisor, where the second VM instance is an untrusted domain associated with a customer user of the server device. The second VM instance may be allocated a second region of memory. The server may further store or access shared data stored in the first region of memory allocated to the first VM instance and designated as accessible by the second VM instance. There may further be a proxy driver executing within the second VM instance, where the proxy driver is configured to intercept file system calls within the second VM instance and, when an intercepted file system call is associated with the shared data, proxy the file system call to the first VM instance for execution.

BRIEF DESCRIPTION OF THE DRAWINGS

Having thus described aspects of the disclosure in general terms, reference will now be made to the accompanying drawings, which are not necessarily drawn to scale, and wherein:

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
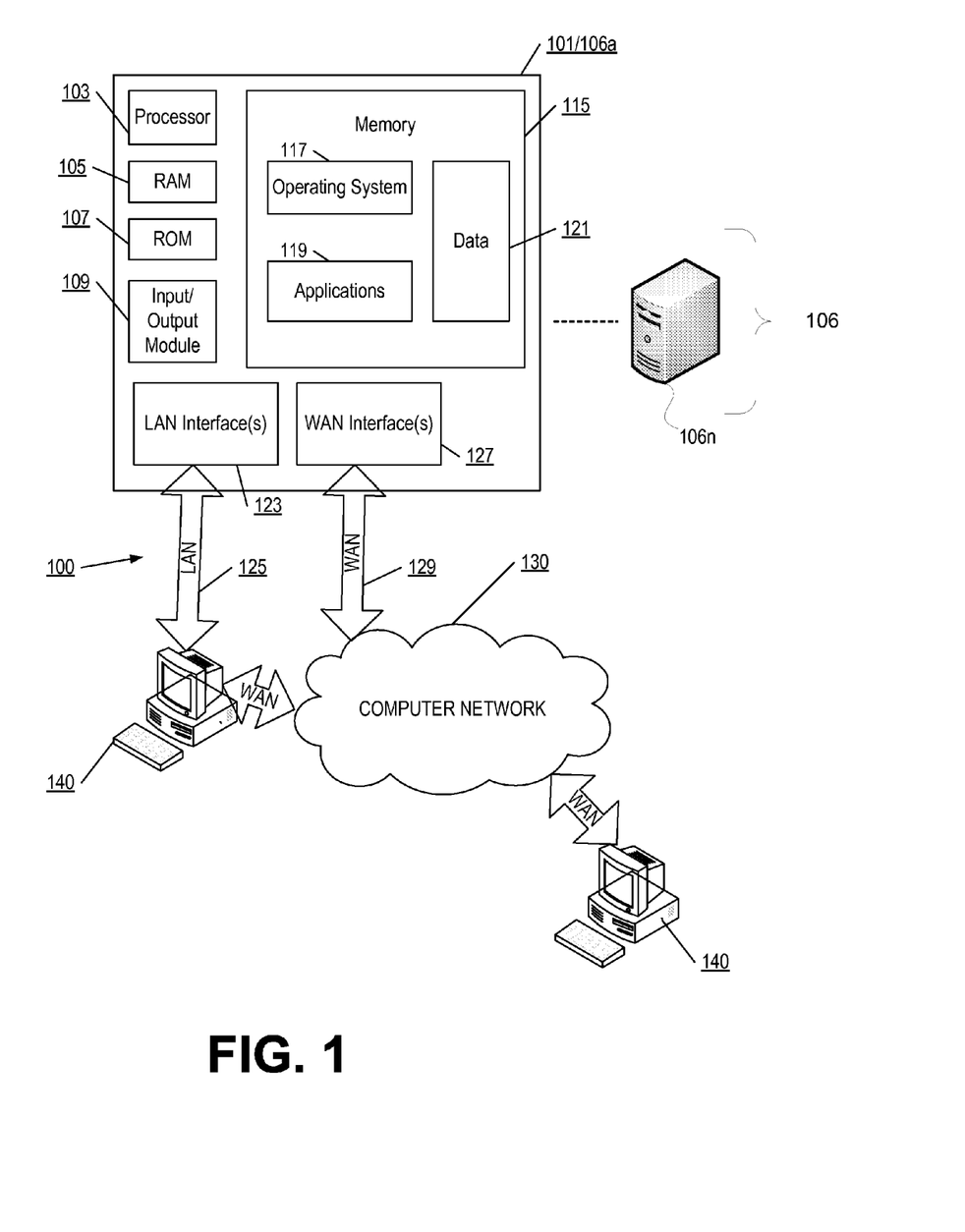
FIG. 1 illustrates an example operating environment in which various aspects of the disclosure may be implemented.

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine (s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 2:
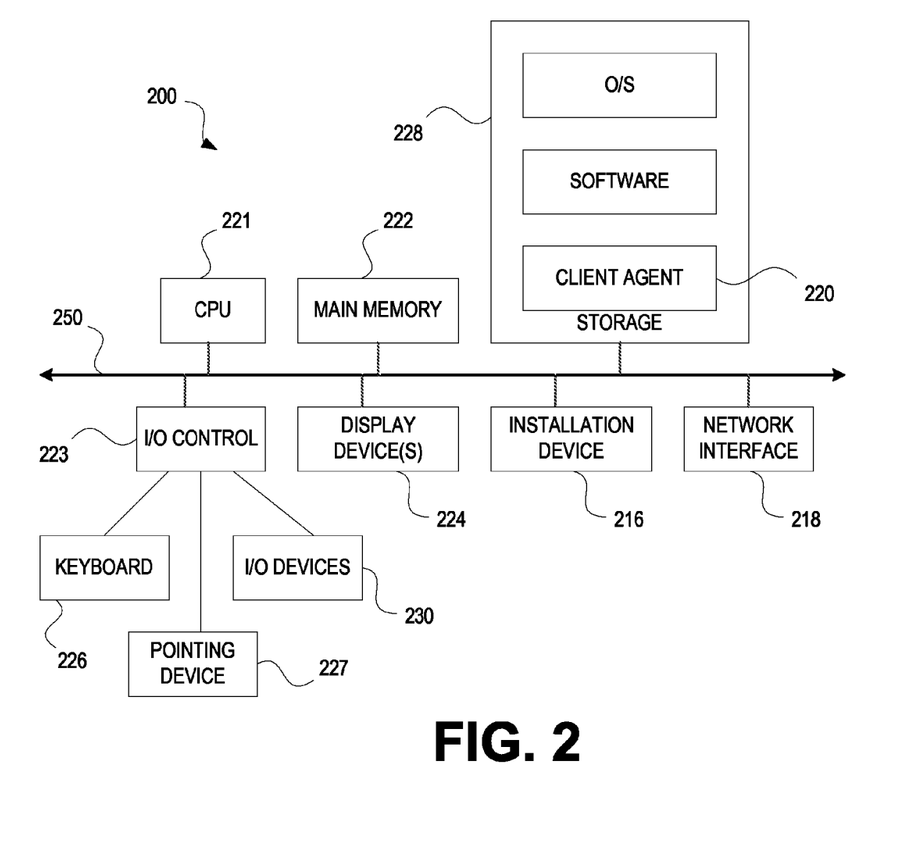
FIG. 2 illustrates a computing device that may be used in accordance with one or more illustrative aspects described herein.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

Figure 3:
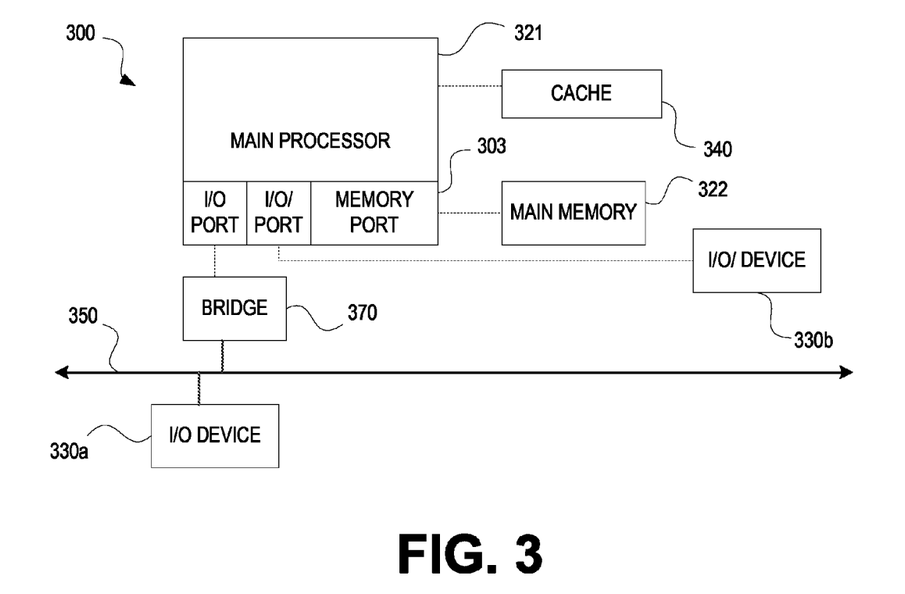
FIG. 3 illustrates a computing device that may be used in accordance with one or more illustrative aspects described herein.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif. While FIGS. 1-3 may be described with respect to specific examples of hardware and/or software that may be used, such examples are in no way limiting, but instead are merely illustrative of the type of resources that may be utilized as technology progresses.

FIGS. 1-3 show a high-level architecture of an illustrative desktop virtualization system. As shown, the desktop virtualization system may be single-server or multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 4:
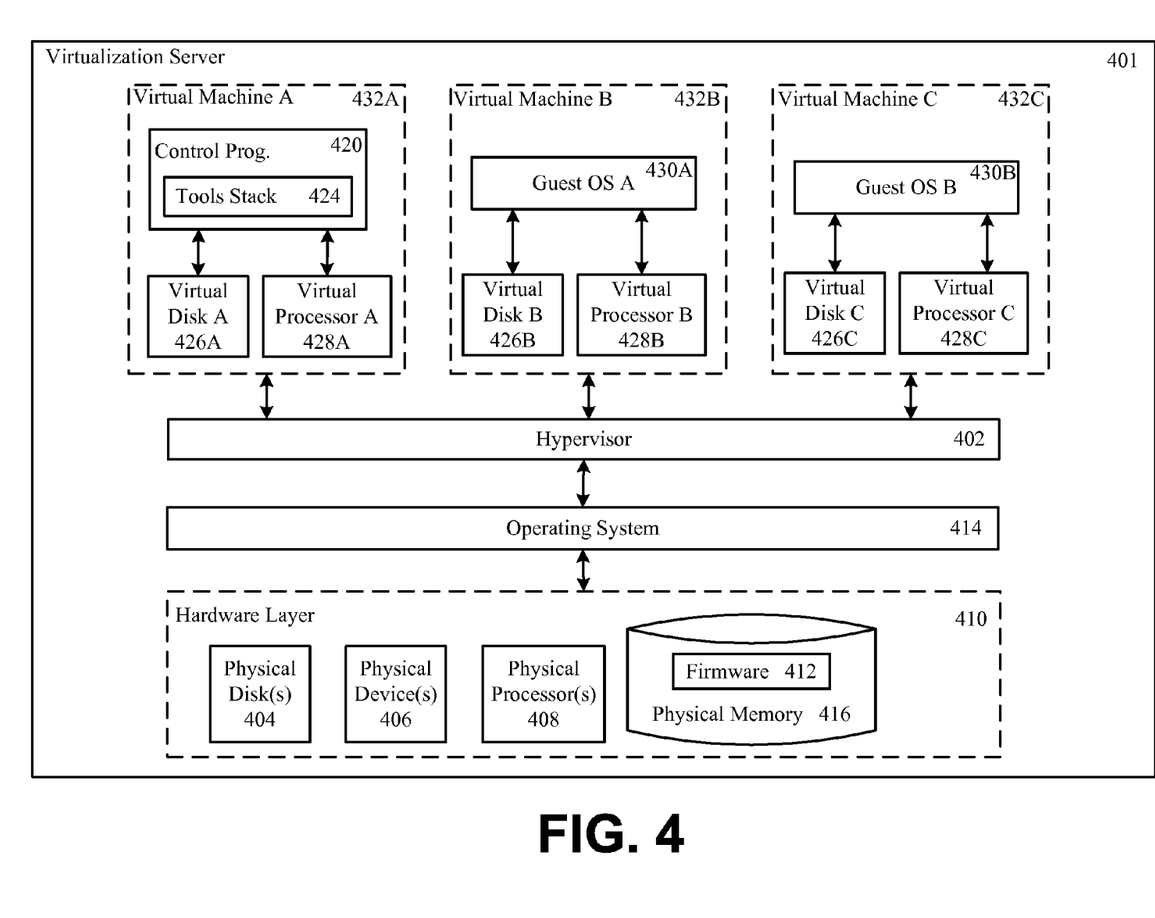
FIG. 4 is a block diagram that depicts embodiments of a virtualization server in accordance with one or more illustrative aspects described herein.

Illustrated in FIG. 4 is one embodiment of a computer device 401 configured as a virtualization server in a virtualization environment, for example, a single-server, multi-server, or cloud computing environment. The virtualization server 401 illustrated in FIG. 1 can be deployed as and/or implemented by one or more embodiments of the server 106 illustrated in FIG. 1 or the computing devices 200 and 300 illustrated in FIGS. 2 and 3. Included in virtualization server 401 is a hardware layer that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C can executed, on a virtual processor 428B-C, a guest operating system 430A-B.

Further referring to FIG. 4, and in more detail, the virtualization server 401 may include a hardware layer 410 with one or more pieces of hardware that communicate with the virtualization server 401. In some embodiments, the hardware layer 410 can include one or more physical disks 404, one or more physical devices 406, one or more physical processors 408, and one or more memory 416. Physical components 404, 406, 408, and 416 may include, for example, any of the components described above in FIGS. 1-3. For instance, physical disks 404 may include permanent memory storage, temporary memory storage, disk drives (e.g. optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401.

Virtualization server 401 may also include a hypervisor 402. In some embodiments, hypervisor 402 may be a program executed by processors 408 on the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. A Type 1 hypervisor may execute directly on one or more physical processors of 408 the virtualization server 401, and may include program data stored in the physical memory 416.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks; physical processors; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may executes a guest operating system 430 within the virtual machine 432. In still other embodiments, the virtual machine 432 may execute the guest operating system 430.

In addition to creating virtual machines 432, the hypervisor 402 may control the execution of at least one virtual machine 432. In other embodiments, the hypervisor 402 may presents at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 is a set of executable instructions that, when executed by a processor 408, imitate the operation of a physical computer such that the virtual machine 432 can execute programs and processes much like a physical computing device. While FIG. 4 illustrates an embodiment where a virtualization server 401 hosts three virtual machines 432, in other embodiments the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the virtual processor 408 provides a modified view of the physical processors 408 such that at least some of the characteristics of the virtual processor 428 are different than the characteristics of the corresponding physical processor 408.

Figure 5:
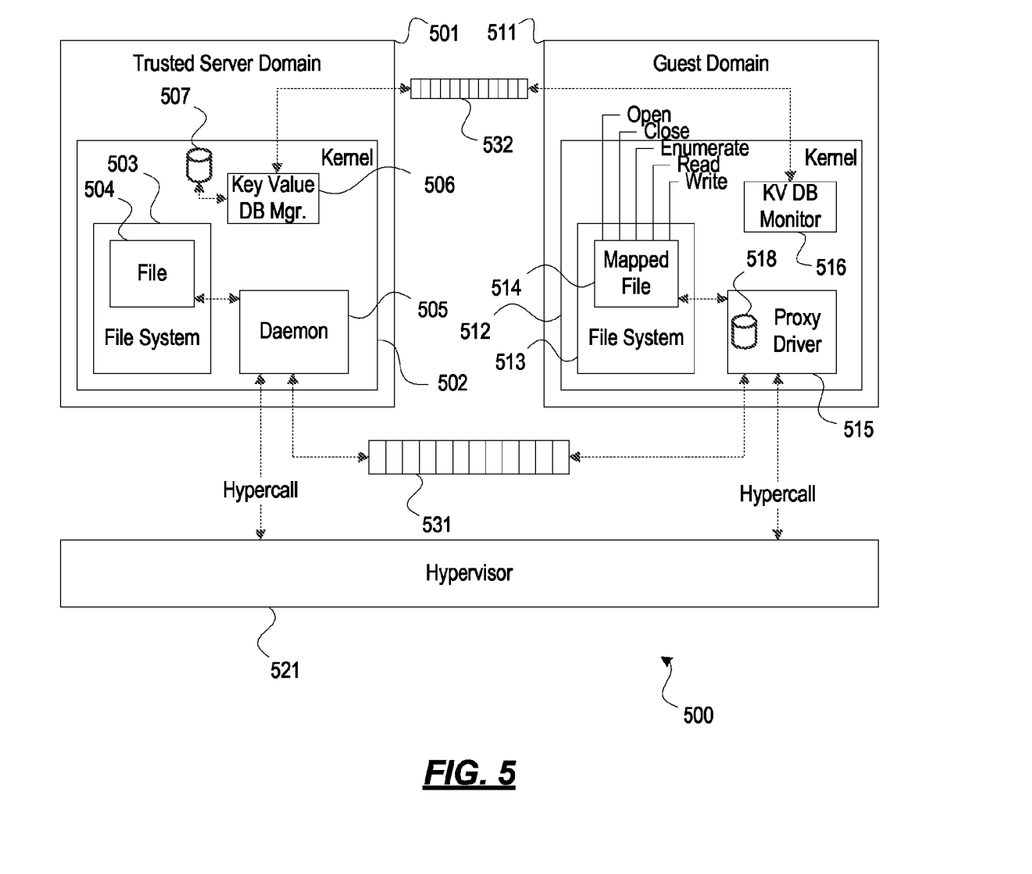
FIG. 5 illustrates an example system architecture in which aspects described herein may be performed.

FIG. 5 illustrates an example of a cloud-based virtualization system 500. As seen in FIG. 5, system 500 may be a virtualization server such as server 401. System 500 includes a trusted server domain 501 (e.g., virtual machine 432A) and a guest domain 511 (e.g., virtual machine 432B) executing on a hypervisor 521 (e.g., hypervisor 402 and/or operating system 414, depending on whether the virtualization system is a type 1 or type 2 hypervisor system). Each of trusted domain 501 and guest domain 511 may include a corresponding kernel 502, 512 and file system 503, 513. Virtualization system 500 may include other guest domains as well. However, for ease of understanding and for illustrative purposes, only a single guest domain is shown. Trusted domain 501 may also be referred to as domain zero (Dom 0), and may perform management and administrative functions of the virtualization system 500 in order to effect the ability of virtualization system 500 to execute one or more guest domains.

Trusted server domain 501 may include a key value store (also referred to as a key value database) 507 administered by a key value manager 506. Key value store 507 may be an implementation of XenStore™ by Citrix Systems Inc. of Fort Lauderdale, Fla. XenStore™ is an information storage space shared between domains, and may be used to share configuration, metadata and status information. Each guest domain may get its own path in the key value store. When values are changed in the key value store, the corresponding driver 516 is notified. The key value store may be a shared hierarchical key value store, or may be any other type of key value store or registry.

Trusted server domain 501 may further include a file 504 within file system 503 that is to be shared with guest domain 511 via daemon 505. Daemon 505 may transfer data back and forth with guest domain 511 via first shared memory 531, which is also accessible by proxy driver 515 of guest domain 511, as further described below. Proxy driver 515 may be installed during an update process, such as Windows Update, by a network administrator, during an installation process, or via any other known or developed technique. Guest domain 511 may further include key value database monitor 516 that monitors updates to the key value database via second shared memory 532. Monitor 516 may be a driver separate from proxy driver 515. When monitor 516 detects a change to the key value database indicating that one or more files are available, monitor 516 may update database 518 of proxy driver 515. Database 518 stores a local record of files made available by trusted domain 501, so that proxy driver 515 can determine whether to make a file system call to local file system 513 or to file system 503 of trusted domain 501. Shared memory 531, 532 may be the same or different portions of physical memory.

Proxy driver 515 maintains database 518 and acts to intercept calls made by any application or program executing within guest domain 511 to access the guest domain's file system 513. Database 518 stores metadata information regarding files available from trusted domain 501 rather than from guest domain 511. When the desired file is located within file system 513, the file system call may be sent to file system 513 as normal. However, when the desired file is actually a file shared by trusted domain 501, proxy driver 515 proxies the request to trusted domain 501 via shared memory 531 as further described below. Metadata regarding files available in trusted domain 501 may be received via key value database 507 and shared memory 532, whereas file contents may be received via shared memory 531 as further described herein.

Shared memory 531 may be a page or pages of memory allocated to or by guest domain 511 that guest domain 511 makes available to one or more other domains, e.g., to trusted domain 501. Guest domain 511 grants rights to trusted domain 501 to access shared memory 531, e.g., using Grant Tables, by indicating in key value database 507 which pages are available to trusted domain 501, and/or by instructing hypervisor 521 to grant permission to trusted domain 501 to have read/write access to that page or pages of memory. Thus, when guest domain 511 shares a page or pages of memory with another domain, hypervisor 521 (or system 500) permits access to those pages by the other domain.

Memory 531, 532 may be shared as a circular ring or buffer. Each of the sharer (guest domain 511) and sharee (trusted domain 501) may maintain a pointer to its corresponding last read/write position in the shared memory, where the pointer moves back to the first memory location in the page after consuming the last memory location in the page. According to one aspect, when a guest domain shares a page or pages of memory, the guest domain may also allocate, designate, and/or store one or more pointers in the shared memory for use by each of the sharer (guest domain) and sharee (trusted domain) to maintain a current or last read location within the shared memory. Thus, each of the sharer and sharee can read the pointer of the other domain and ensure that one domain does not overwrite data not yet read by the other domain (e.g., does not "lap" the other domain). In another possible embodiment, pointer locations may be updated in key value database 507 so that one domain never overwrites data that has not yet been consumed by the other domain. Hypercalls may be used to as necessary to access desired information or request specific resources. A hypercall is a software trap from a domain to the hypervisor, just as a syscall is a software trap from an application to the kernel or OS. Domains may use hypercalls to request privileged operations such as updating page tables. Like a syscall, a hypercall is synchronous, but the return path from the hypervisor to the domain may use event channels. An event channel is a queue of asynchronous notifications, and notify of the same sorts of events that interrupts notify on native hardware. An event channel may be used, e.g., by each domain to notify the other domain when there is new data written to shared memory for the other domain to retrieve.

Methods for performing trusted file indirection will now be described with further reference to FIG. 6 and FIG. 7. Trusted file indirection, generally, is the process of safely injecting one or more files into a file system of a guest domain from a trusted domain. Trusted file indirection may be used, e.g., to allow one domain access to a file in the file system of another, trusted domain, without breaching security of the trusted domain. File indirection may be useful, e.g., to apply hotfixes and inject other files into guest domains, rather than requiring comprehensive tools to be installed on the guest domain. Thus, trusted file indirection may be used instead of installing an ISO image or other utilities to perform hotfixes and updates.

Figure 6:
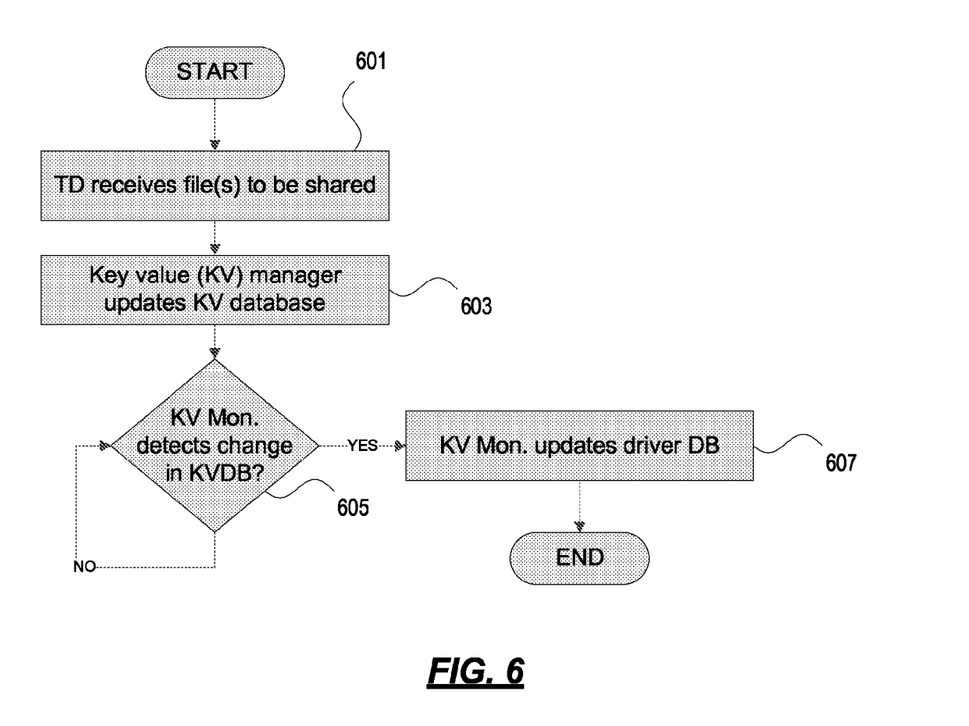
FIG. 6 illustrates a method of updating shared file information according to one or more aspects describe herein.

FIG. 6 illustrates a method for updating a database storing shared file information and notifying other domains about the shared file information. Initially, in step 601, trusted domain 501 receives one or more files 504 in one or more directories that are to be shared with guest domain 511. The files may be placed in file system 503 by a system administrator, by an automated update routine (e.g., similar to Windows® Update), or by any other desired means. In step 603, key value manager 506 updates key value database 507 to reflect the one or more domains with which the files are to be shared. The key value manager 506 may also update key value store 507 with metadata regarding the available files, e.g., file name, extension, size, modification date, creation date, etc. In step 605, key value monitor 516 residing in guest domain 511 monitors for changes to key value store that are directed to guest domain 511. When changes are detected, key value monitor in step 607 updates file system DB 518 within proxy driver 515 to reflect the availability of the one or more files (and/or directories). The method then ends, and may be repeated when additional shared file(s) are stored in trusted domain 501.

Figure 7:
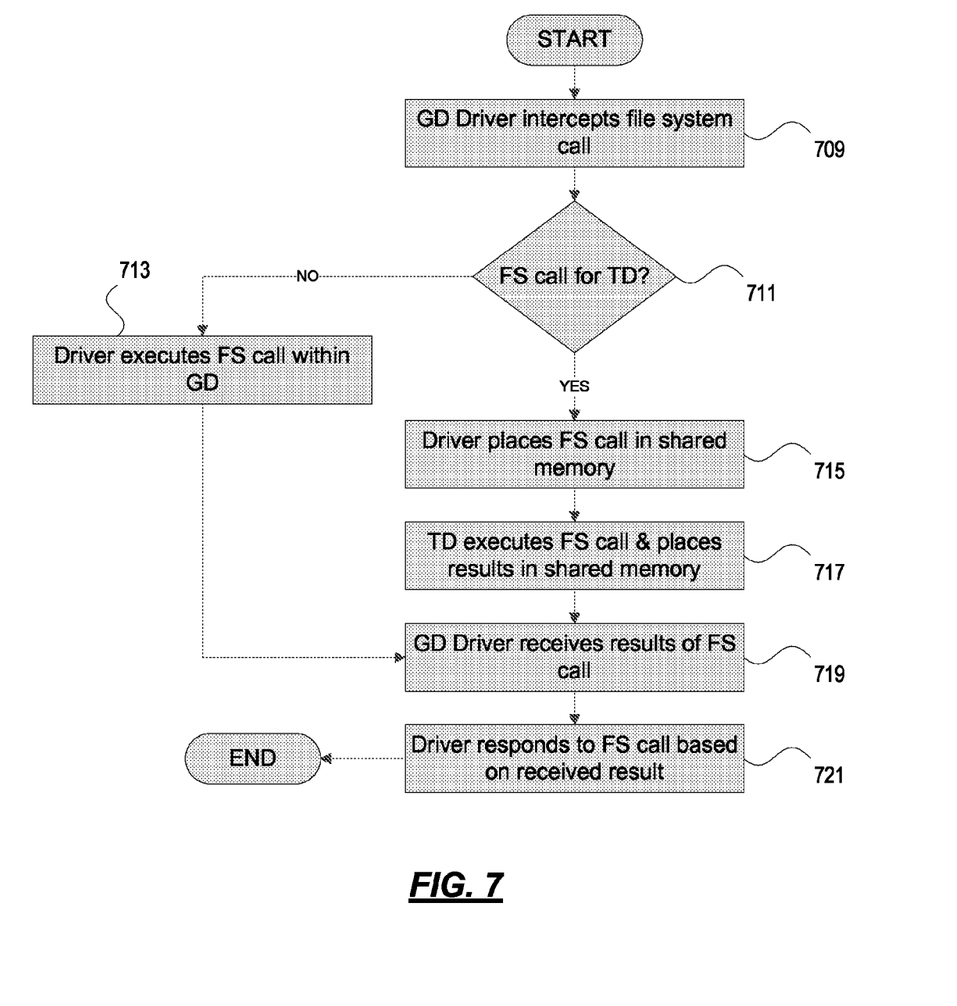
FIG. 7 illustrates a method of performing trusted file indirection according to one or more aspects described herein.

FIG. 7 illustrates a method for intercepting file system calls to provide guest domain 511 with access to shared files stored on trusted domain 501. In step 709 proxy driver 515 intercepts a file system call by an application or program executing within guest domain 511. The file system call may be a read, write, directory listing, file open, or any other file system call. In step 711 proxy driver 515 queries database 518 to determine whether the requested data is stored locally within file system 513, or externally in file system 503 associated with trusted domain 501. In step 713, when the requested data is stored locally within file system 513, proxy driver 515 sends the file system command to file system 513 for execution, and the results are returned to proxy driver 515 in step 719. If the requested data is stored in file system 503 of trusted domain 501, then in step 715 proxy driver 515 sends the file system call to trusted domain 501 by placing the file system call in shared memory 531.

After receiving the file system call, in step 717 daemon 505 on trusted domain 501 executes the file system call on file system 503. For example, when the file system call is a write command, daemon 505 may write to file 504. When the file system call is a read comment, daemon 505 may fetch data from file 504. In step 719 daemon 505 returns the results of the file system call to proxy driver 515 by placing the results in shared memory 531. In step 719 proxy driver 515 retrieves and/or receives the file system call result. When the file system call is a write command, the results may include a success acknowledgement. When the file system call is a read command, the results may include all or a portion of the read data, e.g., streamed through shared memory 531 as data is retrieved by daemon 505 and received by proxy driver 515. After the file system call is completed by either daemon 505 or file system 513, in step 721 proxy driver 515 responds to the entity from which the original file system call was received in step 709.

Various steps of the above method may be combined, split, or reordered to accomplish a similar result. Using a method similar to that described above, a trusted domain can inject one or more files (and/or directories) into a guest domain so that the data appears to be within the local file system of the guest domain, when in fact the data resides within another domain sharing the data. For example, when guest domain 511 makes a file system call requesting information to present in a file directory, e.g., within Windows Explorer, proxy driver 515 may combine information available from both local file system 513 and trusted domain file system 503 to enumerate and present a single file structure that appears unified, or may alternatively enumerate and present files from trusted domain 501 to appear in a separate directory or location from those files located in guest domain file system 513. When a user requests a file from the directory or location corresponding to trusted domain 501, proxy driver 515 actually proxies that request to trusted domain 501 using a method such as that described above with respect to FIG. 7. Data can thus "appear" to be within a guest domain's file system, when in fact the data resides in a different domain, even when the guest domain has no network connection and without emulating any virtual hardware (e.g., mounting a virtual CD-ROM, DVD, or other mountable file storage).

Various modifications may be made to implement trusted file indirection using slightly different techniques. For example, instead of shared memory, all data may be passed through the key value store. However, key value store transfers may be slower than using directly accessed shared memory. In another alternative, a single shared memory may be used for all transfers, rather than separate shared memory 531, 532. In some embodiments, techniques described herein may be used to emulate a disk in the guest domain. However, disk emulation may be under operating system control and can introduce unnecessary complexities resulting from not being able to trap requests using proxy driver 515. In yet other embodiments, file transfer may occur over a shared network volume. However, network security issues must then be taken into account, and guest domain network access may be blocked according to user security settings.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

The invention claimed is:

1. One or more non-transitory computer readable storage media comprising computer executable instructions that, when executed, perform data transfer between a trusted domain and a guest domain executing on a hypervisor by:
   the guest domain receiving an indication that modified shared data is available, wherein said modified shared data is modified outside the control of the guest domain;
   a proxy driver executing in the guest domain intercepting a file system call associated with the modified shared data;
   the driver sending the file system call associated with the modified shared data to the trusted domain;
   the trusted domain executing the file system call associated with the modified shared data; and
   the trusted domain returning information to the guest domain based on execution of the file system call associated with the modified shared data.

2. The computer readable media of claim 1, wherein the indication is based on key value store managed by the trusted domain, said key value store storing file metadata regarding the modified shared data.

3. The computer readable media of claim 2, wherein the key value store is stored in a memory associated with the trusted domain, and wherein the guest domain monitors the key value store by querying, via a shared memory, a key value store administration service running on the trusted domain.

4. The computer readable media of claim 1, wherein the guest domain allocates a portion of memory as a shared memory, accessible by both the trusted domain and the guest domain, and wherein the proxy driver sends the file system call to the trusted domain via the shared memory, and the trusted domain returns the information to the guest domain via the shared memory.

5. The computer readable media of claim 4, wherein when the file system call comprises a write command, the guest domain sends data to be written to the trusted domain via the shared memory, and the trusted domain returns a completion indicator to the guest domain via the shared memory.

6. The computer readable media of claim 4, wherein when the file system call comprises a read command, the guest domain sends the read command to the trusted domain via the shared memory, and the trusted domain returns the requested read data to the guest domain via the shared memory.

7. The computer readable media of claim 1, wherein the modified shared data comprises a file.

8. The computer readable media of claim 1, wherein the modified shared data comprises a directory.

9. A server device comprising:
   a processor; and
   memory storing computer readable instructions that, when executed by the processor, configure the device to include:
      a hypervisor for managing execution of a plurality of virtual machine (VM) instances, said managing including allocating a different portion of memory to each instance;
      a first VM instance executing on the hypervisor, said first VM instance being a trusted server domain for administration of the server device, said first VM instance allocated a first region of memory;
      a second VM instance executing on the hypervisor, said second VM instance being an untrusted domain associated with a customer user of the server device, said second VM instance allocated a second region of memory;
      shared data stored in the first region of memory allocated to the first VM instance and designated as accessible by the second VM instance, wherein said shared data originates from the first VM instance; and
      a proxy driver executing within the second VM instance, said proxy driver configured to:
         intercept file system calls within the second VM instance; and
         when an intercepted file system call is associated with the shared data, proxying the file system call to the first VM instance for execution.

10. The server device of claim 9, wherein said second VM instance designates a portion of the second region of memory as shared memory with the first VM instance, and wherein said second VM instance proxies the file system call to the first VM instance by writing the file system call to the portion of the shared memory.

11. The server device of claim 9, wherein the shared data comprises a plurality of data files.

12. The server device of claim 9, wherein the shared data comprises a file directory.

13. The server device of claim 9, further comprising a key value store stored in the first region of memory, said key value store storing file metadata regarding the shared data, where said file metadata is accessible by the second VM instance.

14. A method of transferring data, comprising:
   receiving, by a guest domain executing on a hypervisor, an indication that modified shared data is available, wherein said modified shared data is modified outside the control of the guest domain;
   intercepting, by a proxy driver executing in the guest domain, a file system call associated with the modified shared data;
   sending, by the proxy driver, the file system call associated with the modified shared data to the trusted domain;

executing, by the trusted domain, the file system call associated with the modified shared data; and returning, from the trusted domain to the guest domain, information based on executing the file system call associated with the modified shared data.

15. The method of claim 14, wherein the indication is based on a key value store managed by the trusted domain, said key value store storing file metadata regarding the modified shared data.

16. The method of claim 15, wherein the key value store is stored in a memory associated with the trusted domain, and wherein the guest domain monitors the key value store by querying, via a shared memory, a key value store administration service running on the trusted domain.

17. The method of claim 14, further comprising:
allocating, by the guest domain, a portion of memory as a shared memory, accessible by both the trusted domain and the guest domain;

sending, by the proxy driver, the file system call to the trusted domain via the shared memory; and returning, by the trusted domain, the information to the guest domain via the shared memory.

18. The method of claim 17, wherein when the file system call comprises a write command, the guest domain sends data to be written to the trusted domain via the shared memory, and the trusted domain returns a completion indicator to the guest domain via the shared memory.

19. The method of claim 17, wherein when the file system call comprises a read command, the guest domain sends the read command to the trusted domain via the shared memory, and the trusted domain returns the requested read data to the guest domain via the shared memory.

20. The method of claim 14, wherein the modified shared data comprises one of a file and a directory.

* * * * *